(12) United States Patent
Viswanath

(10) Patent No.: US 7,386,478 B2
(45) Date of Patent: Jun. 10, 2008

(54) DYNAMIC CRITERIA BASED LINE-GROUPING MECHANISM AND METHOD FOR PURCHASE ORDER GENERATION

(75) Inventor: Sridatta Viswanath, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1288 days.

(21) Appl. No.: 09/981,147

(22) Filed: Oct. 15, 2001

(65) Prior Publication Data

US 2003/0074269 A1    Apr. 17, 2003

(51) Int. Cl.
*G06Q 30/00* (2006.01)
(52) U.S. Cl. ....................................................... 705/26
(58) Field of Classification Search ................... 705/26, 705/27
See application file for complete search history.

(56) References Cited

U.S. PATENT DOCUMENTS

| | | | |
|---|---|---|---|
| 4,951,196 A | | 8/1990 | Jackson |
| 5,361,199 A | * | 11/1994 | Shoquist et al. ............... 705/26 |
| 5,557,780 A | | 9/1996 | Edwards et al. |
| 5,694,551 A | | 12/1997 | Doyle et al. |
| 5,708,828 A | | 1/1998 | Coleman |
| 5,758,327 A | * | 5/1998 | Gardner et al. ................ 705/26 |
| 6,023,683 A | * | 2/2000 | Johnson et al. ............... 705/26 |
| 6,044,362 A | | 3/2000 | Neely |
| 6,064,977 A | | 5/2000 | Haverstock et al. |
| 6,065,120 A | | 5/2000 | Laursen et al. |
| 6,125,391 A | | 9/2000 | Meltzer et al. |

(Continued)

FOREIGN PATENT DOCUMENTS

EP     1 049 038 A2 *  2/2000

OTHER PUBLICATIONS

Hallisey, Joanne "Online Procurement Replaces Campus Computer Resale.", T H E Journal (Technological Horizons In Education), 27, 1, 68, Aug. 1999. Retreived from Dialog File: 275, Acc#: 02332816.*

(Continued)

*Primary Examiner*—Naeem Haq
(74) *Attorney, Agent, or Firm*—Robert C. Kowert; Meyertons, Hood, Kivlin, Kowert & Goetzel, P.C.

(57) ABSTRACT

A mechanism and method for dynamic criteria-based line grouping for generating purchase orders within a software procurement system. The software system includes a data structure containing line items of a requisition. Each line item contains criteria that can be used to sort the line item to a particular purchase order, e.g., the criteria could include (1) information regarding the supplier, (2) the billed-to address, (3) the send-to address and (4) the currency used to purchase the line item. A configuration file (LGU file) contains the criteria by which the line items are sorted into purchase orders. This configuration can be dynamically altered by the user at any time thereby altering the manner in which the line items are sorted into purchase orders. A line_group table indicates which line items are grouped within a particular purchase order based on the dynamic configuration of the LGU file. A order_header table relates a line_group table to a requisition. A "host PO" object exists within a line_group table and can represent all line items of a requisition for efficient line item processing.

27 Claims, 8 Drawing Sheets

U.S. PATENT DOCUMENTS

| | | |
|---|---|---|
| 6,144,990 A | 11/2000 | Brandt et al. |
| 6,351,745 B1 | 2/2002 | Itakura et al. |
| 6,609,108 B1 | 8/2003 | Pulliam et al. |
| 6,658,483 B1 | 12/2003 | Iwamoto et al. |
| 6,772,413 B2 | 8/2004 | Kuznetsov |
| 6,876,977 B1 | 4/2005 | Marks |
| 6,882,983 B2 | 4/2005 | Furphy et al. |
| 6,910,018 B1 | 6/2005 | Okada et al. |
| 6,931,420 B1 | 8/2005 | Silvester et al. |
| 2001/0037254 A1 | 11/2001 | Glikman |
| 2001/0047311 A1 | 11/2001 | Singh |
| 2002/0023045 A1 | 2/2002 | Feilbogen et al. |
| 2002/0035606 A1 | 3/2002 | Kenton |
| 2002/0042779 A1 | 4/2002 | Osaka et al. |
| 2002/0062240 A1 | 5/2002 | Morinville |
| 2002/0065693 A1 | 5/2002 | Hattori et al. |
| 2002/0069157 A1 | 6/2002 | Jordan |
| 2002/0087419 A1 | 7/2002 | Anderson et al. |
| 2002/0091533 A1 | 7/2002 | Ims et al. |
| 2002/0107699 A1 | 8/2002 | Rivera et al. |
| 2002/0116205 A1 | 8/2002 | Ankireddipally et al. |
| 2002/0133569 A1 | 9/2002 | Huang et al. |
| 2002/0156685 A1* | 10/2002 | Ehrlich et al. .................. 705/26 |
| 2002/0156687 A1 | 10/2002 | Carr et al. |
| 2002/0174000 A1 | 11/2002 | Katz et al. |
| 2002/0184070 A1 | 12/2002 | Chen et al. |
| 2002/0184076 A1* | 12/2002 | Susnjara ...................... 705/10 |
| 2002/0184123 A1 | 12/2002 | Sljacic et al. |
| 2002/0184145 A1 | 12/2002 | Sijacic et al. |
| 2002/0188524 A1 | 12/2002 | Shimizu |
| 2003/0002526 A1 | 1/2003 | Dias et al. |
| 2003/0061121 A1 | 3/2003 | Ouchi |
| 2003/0069940 A1 | 4/2003 | Viswanath et al. |
| 2003/0074279 A1 | 4/2003 | Viswanath et al. |
| 2003/0110114 A1 | 6/2003 | Dmochowski et al. |
| 2003/0139975 A1 | 7/2003 | Perkowski |
| 2003/0177070 A1 | 9/2003 | Viswanath et al. |

OTHER PUBLICATIONS

Jeetu Patel, et al., "More Options for Electronic Filing," InformationWeek, Manhasset: Nov. 29, 2999, Issue 763, 5 pages.

"Netscape Announces Availability of Netscape BuyerXpert 2.0 for Corporate Procurement," Pheonix, AZ, Nov. 17, 1998, 3 pages.

* cited by examiner

DYNAMIC CRITERIA BASED LINE-GROUPING MECHANISM AND METHOD FOR PURCHASE ORDER GENERATION

TECHNICAL FIELD

The present invention relates to the field of generating and grouping purchase orders over computer networks such as Internet, wide area network, and local area network and any combinations thereof. More specifically, the present invention relates to the field of dynamically generating and grouping purchase orders within a business-to-business software acquisition framework.

BACKGROUND ART

Consumers need to organize and send purchase orders to suppliers for procurement purposes. Procurement is a process in which a buyer makes sure that a purchase order for a particular supplier is accurate and authorized. The organization and procurement of purchase orders are especially necessary for large retailers, wholesalers, manufacturers, and electronic companies who buy many different types of items from many different suppliers. Manufacturers need to replenish their parts in stock to keep up with their production schedule. Grocery retailers need to replenish their perishable items in a supermarket. Electronic companies need to buy parts for their newly designed products. Wholesalers need to purchase large quantities of goods from many different manufacturers. Furthermore, regular consumers who often shop over the Internet for discounted products from different suppliers also need to organize their purchasing records. All of these consumers can make use of a software program to organize and send purchase orders to suppliers so that billing statements are generated accurately and purchased items are received on schedule.

This procurement process is very important because it is costly for both consumers and suppliers if purchase orders are missing and get sent to the wrong consumers or if purchases are unauthorized. It takes time and money to tract down missing purchase orders and correct inaccurate billing statements. Suppliers may loose customers if the procurement is not accurate. On the other hand, consumers such as grocery stores, retailers, wholesalers, and manufacturers may loose profits without accurate procurement because they have business schedules that depend upon the delivery of the purchased items. Therefore, consumers and suppliers need a software program which can help them in the organization and procurement of purchase orders.

This need is especially felt by both consumers and suppliers as the electronic commerce activities increase. In the recent years, the number of on-line consumers and suppliers has increased. An online or an electronic consumer is a consumer who purchases items over the Internet or the World Wide Web (www). On-line purchasing becomes a convenient, cost effective, and timesaving method of buying. Over the Internet, consumers can examine and select items that they want to purchase by interacting with web pages such as clicking and dragging items into an electronic shopping cart. The suppliers of the selected-and-purchased items then send these consumers a billing statement. On-line market is also a good method for suppliers to commercialize their products. It is economical and convenient for suppliers to post their catalogs online to advertise their products. Consequently, as the electronic commerce activities increase, the demand for a procurement software program also increases.

The boom of electronic commerce has brought about many software programs to assist buyers and suppliers in different phases of purchasing and procurement processes. However, software programs that currently exist in the market are often not compatible to one another because they are designed by different software firms for a particular type of electronic commerce and for a particular phase in the electronic purchasing process. For example, one software company creates software for an electronic commerce web page, but another company could create software for the procurement application. The first software program is not likely to understand the codes and variables in another company's software. When incompatible software programs do not understand one another, they would likely cause errors in the billing statements and other costly discrepancies in the electronic commerce. Thus, there exists a need for a dynamic procurement software program that can work well with other software programs.

Stand-alone software program can help consumers in the organization but not in the online procurement of the purchase orders. There exist many stand-alone or computer network software applications to help consumers in dealing with the organization of their purchase orders. Consumers may use these software applications to fill out purchase orders and send to suppliers via electronic mail (email) for procurement. For example, the relational databases such as Access, File Maker, etc., enable users to create their own purchasing categories, headers. These software users can sort purchasing records and calculate total payment due to each supplier. In order to use the relational database, consumers have to painstakingly enter each item, each supplier, currency, address, etc. Sometimes, the number of records can reach to tens of thousands. It is very time-consuming and tedious to use these databases. For instance, consumers have to learn how to create headers, items, suppliers, etc., and learn how to sort, classify information. When their purchasing needs change, these consumers have to change the configuration of their databases. Furthermore, some relational databases cannot handle electronic commerce issues. These relational databases are not designed to work compatibly with other commercial web pages to automatically enter purchasing items into the database. These relational databases are designed to solve off-line organization problems wherein users have thousands of records and want to enter, and organize the information. Therefore, many relational databases cannot handle online purchase where a consumer sends and receives purchase orders to suppliers for billing and for procurement.

There exists other software to assist online consumers in solving procurement problems but they are not generally adaptable to consumers' changing purchasing needs. This software can help consumers to place an order, receive a bill, and make payments in many online purchasing situations. However, this software does not allow consumers to change the configuration to meet with their changing purchasing needs. Consumers can only handle and sort data in a certain headers, and predefined categories, etc. Consumers cannot always change the features of the software to fit their changing needs. For example, an antiques dealer who recently finds new antique sources overseas needs to reclassify its purchase orders and method of shipment because the consumer now has to pay in different currency and ship to a different location. Furthermore, different consumers have different types of purchasing. An electronic manufacturer has different ways to manage its purchasing as well as their payment methods. A grocery retailer may need different purchasing categories to classify his or her purchasing. Existing software does not provide flexibility to buyers in the face of the above problems.

For instance, a consumer would need to change the headers and sort categories in each program at installation time to fit their needs; and they then need to compile their program again. Compiling a software program takes specialized engineering training and is very time-consuming. Moreover, many software programs offer configuration that cannot be altered at all. As mentioned above, these programs are often not compatible with other existing programs, causing tremendous problems in the procurement process. Therefore, existing software programs for procurement cannot adapt to consumers' needs.

SUMMARY OF THE INVENTION

Accordingly, a need exists for a method and system for dynamically generating and grouping line items into purchase orders (PO) and wherein the method is also compatible with other software programs to meet the changing demands of consumers and to allow consumers to efficiently organize their PO in custom ways. These and other advantages of the present invention will become obvious to those of ordinary skill in the art after having read the following detailed description of the preferred embodiments which are illustrated in the drawing figures.

A mechanism and method are disclosed for dynamic criteria-based line grouping for generating purchase orders within a software procurement system. The software system includes a data structure containing line items of a requisition. Each line item contains criteria that can be used to sort the line item to a particular purchase order, e.g., the criteria could include (1) information regarding the supplier, (2) the billed-to address, (3) the send-to address (e.g., the address where the PO can be physically posted/mailed) and (4) the currency used to purchase the line item. A configuration file (LGU file) contains the criteria by which the line items are sorted into purchase orders. This configuration can be dynamically altered by the user at any time thereby altering the manner in which the line items are sorted into purchase orders. A line_group table indicates which line items are grouped within a particular purchase order based on the dynamic configuration of the LGU file. An order_header table relates a line_group table to a requisition. A "host PO" object exists within a line_group table and can represent all line items of a requisition for efficient line item processing.

One embodiment of the present invention is a method for generating purchase orders using a dynamic-criteria based line-grouping mechanism that includes the steps of: selecting a set of criteria for grouping purchase order; adding items into an electronic shopping cart; generating planned purchase orders from those items; generating an order_header table which maps to a requisition; generating a line_group_unit table, which groups line items into purchase orders, includes billed_to, send_to, and currency criteria; and grouping a line of the same criteria in a line_group table. The method can further comprise the step of: recalculating the criteria, adding and deleting lines and purchase orders. This method may be implemented in a system embodiment of the present invention which comprises an address bus, at least one processor coupled to the bus for executing instructions of the line-grouping method and a memory which stores the instructions of the line-grouping mechanism.

In one embodiment, special host purchase order can be defined to include all line items of the requisition. This aids in purchase order processing for functions that are to be applied to all items of a requisition. The host PO can be an object of a line_group table.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
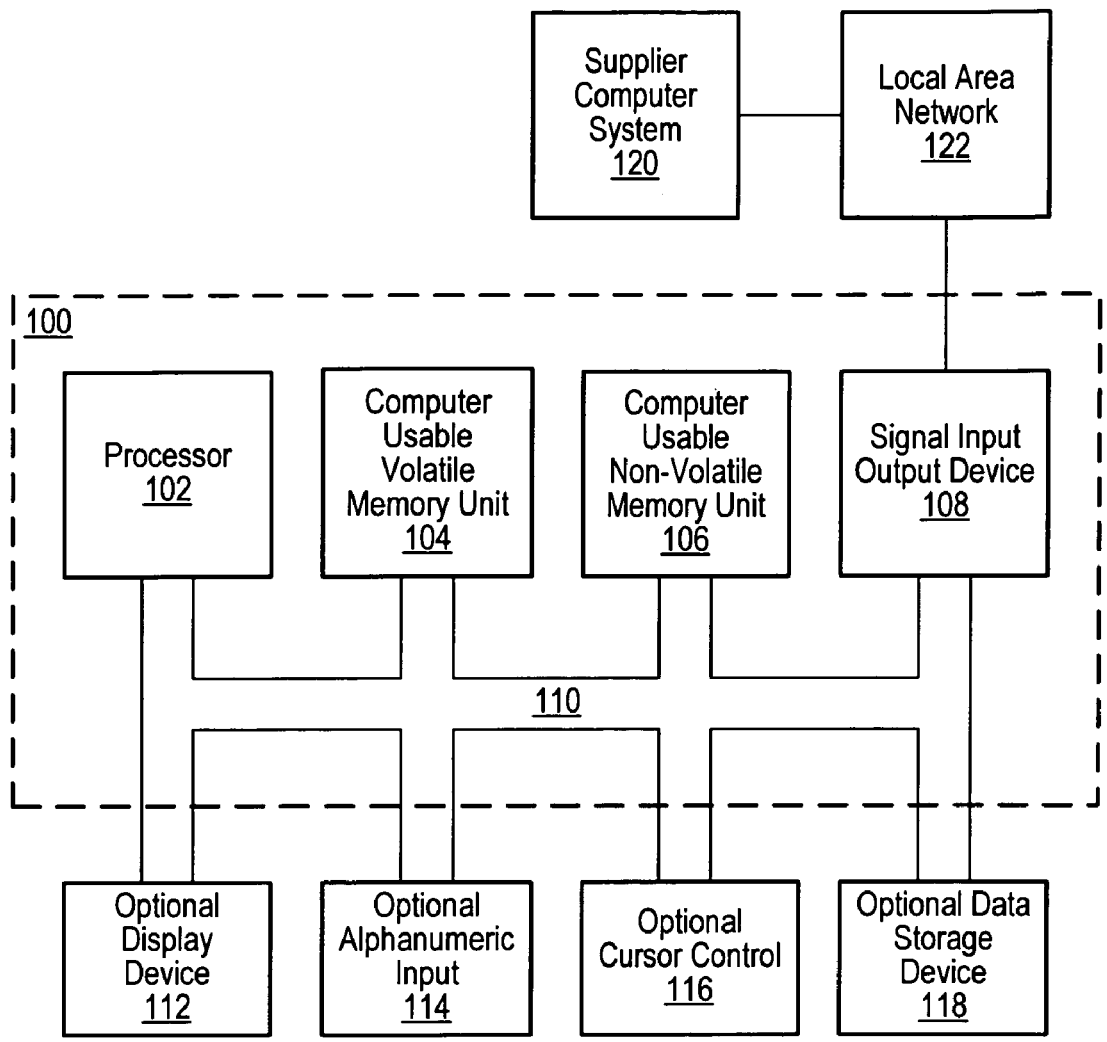
FIG. 1 illustrates a general purpose computer system in accordance with an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "determining" or "outputting" or "transmitting" or "locating" or "storing" or "displaying" or "receiving" or "recognizing" or "utilizing" or "generating" or "providing" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Exemplary Computer System in Accordance with the Present Invention

FIG. 1 is a block diagram of one embodiment of an exemplary computer system 100 that can be used in accordance with the present invention. System 100 is well suited to be any type of computing device (e.g., server computer, portable computing device, etc.). Within the following discussions of the present invention, certain processes and steps are discussed (e.g., processes 400 and 418) that are realized, in one embodiment, as a series of instructions (e.g., software program) that reside within computer readable memory units of computer system 100 and executed by a processor(s) of system 100. When executed, the instructions cause computer 100 to perform specific actions and exhibit specific behavior which is described in detail below.

Computer system 100 of FIG. 1 comprises an address/data bus 110 for communicating information, one or more central processors 102 coupled with bus 110 for processing information and instructions. Central processor unit 102 may be a microprocessor or any other type of processor. The computer 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. System 100 also includes one or more signal generating and receiving devices (I/O circuit) 108 coupled with bus 110 for enabling system 100 to interface with other electronic devices. The communication interface(s) 108 of the present embodiment may include wired and/or wireless communication technology. For example, in one embodiment of the present invention, the communication interface 108 is a serial communication port, but could also alternatively be any of a number of well-known communication standards and protocols.

Optionally, computer system 100 can include an alphanumeric input device 114 including alphanumeric and function keys coupled to the bus 110 for communicating information and command selections to the central processor(s) 102. The computer 100 can include an optional cursor control or cursor directing device 116 coupled to the bus 110 for communicating user input information and command selections to the central processor(s) 102. The system 100 can also include a computer usable mass data storage device 118 such as a magnetic or optical disk and disk drive (e.g., hard drive or floppy diskette) coupled with bus 110 for storing information and instructions. An optional display device 112 is coupled to bus 110 of system 100 for displaying video and/or graphics.

It will be appreciated by one of ordinary skill in the art that computer 100 can be part of a larger system. For example, computer 100 can be a server computer that is in data communication with other computers. As illustrated in FIG. 1, computer 100 is in data communication with a supplier computer system 120 via a network 122, such as a local area network (LAN) or the Internet.

Dynamic Line Grouping Mechanism

In another embodiment of the present invention, a dynamic criteria based line-grouping mechanism for purchase order generation is described. The invention provides a dynamic way of generating purchase orders (POs) based on criteria that can be configured by the consumer. The invention includes a data structure containing line items of a requisition. Each line item contains criteria that can be used to sort the line item to a particular purchase order, e.g., the criteria could include (1) information regarding the supplier, (2) the billed_to address, (3) the send_to address and (4) the currency used to purchase the line item. A configuration file (LGU file) contains the criteria by which the line items are sorted into purchase orders. This configuration can be dynamically modified by the user at any time thereby altering the manner in which the line items are sorted into purchase orders. A line_group table indicates which line items are grouped within a particular purchase order based on the dynamic configuration of the LGU file. An order_header table relates a line_group table to a requisition.

A "host PO" object exists within a line_group table and can represent all line items of a requisition for efficient line item processing. This design mechanism for grouping POs is called the dynamic criteria based line-grouping mechanism for purchase order (PO) generation. In an electronic commerce, the dynamic criteria based line-grouping mechanism for purchase order (PO) generation allows consumers to dynamically select a set of criteria, engage in electronic commerce, generate and group purchase orders, and send these organized POs to different suppliers for procurement. The program uses line group unit (LGU) mechanism to generate and group POs. The LGU mechanism is an engine compatible with other procurement software applications. An objective of Line Grouping Engine (LGE) is to provide the mechanism used by other engines such as Shipping Charge Engine, Price/Discount Engine or Business Object, to group line items based on different criteria.

Figure 2:
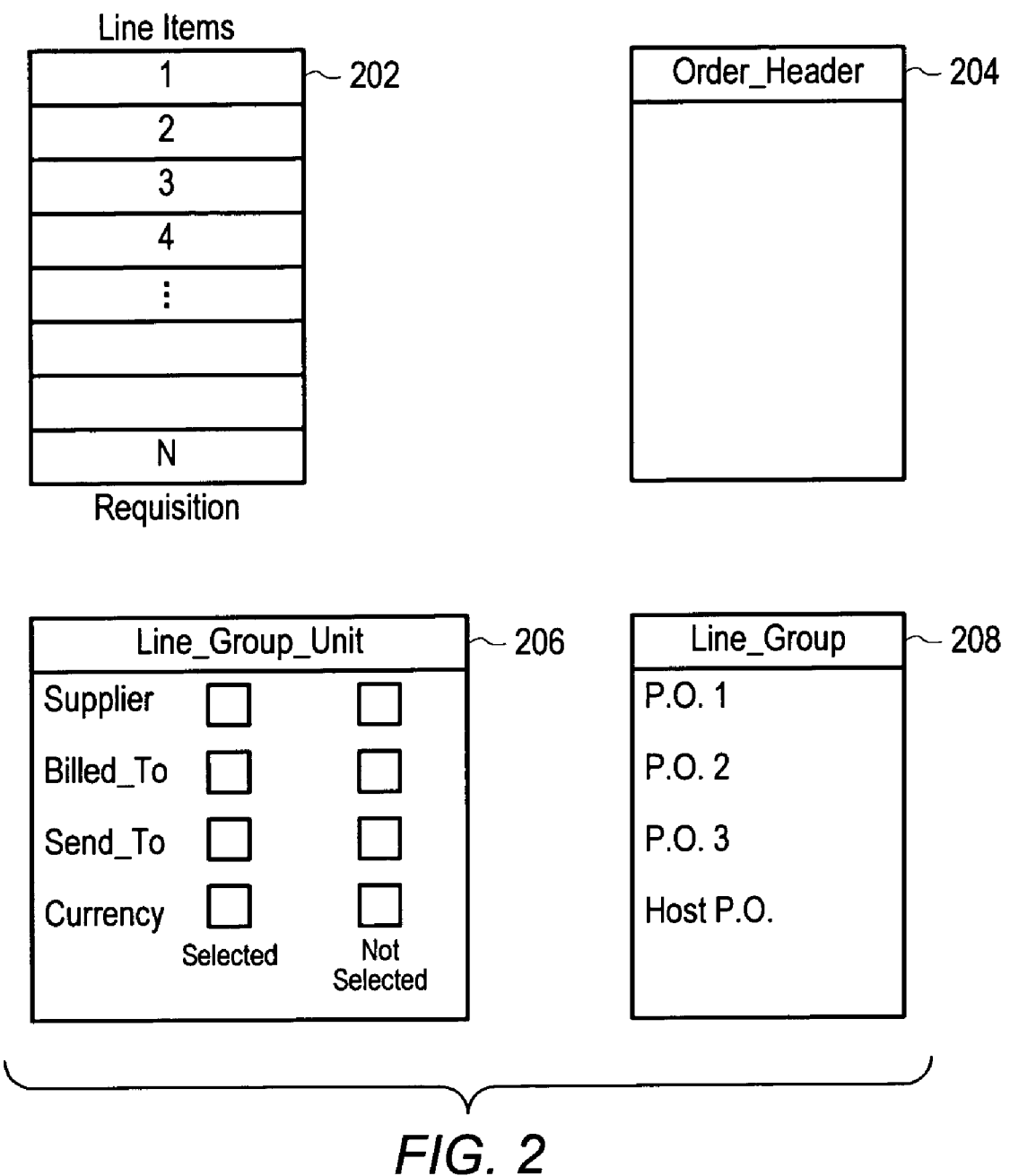
FIG. 2 illustrates block diagrams showing the organization of a dynamic criteria based line grouping mechanism for purchase order generation in accordance with an embodiment of the present invention.

FIG. 2 shows the block diagram data structures of the organization of the program. In order to dynamically group lines, the program organizes lines, requisition, PO criteria, and purchase orders into four main tables: an order_header table maps a requisition to a line group table and hold requisitions, lines, the line_group_unit (LGU) configuration file comprises all the user selectable PO sorting criteria, and the line_group table (that holds PPOs and POs) comprises purchase orders and groups line items into purchase orders.

Figure 3:
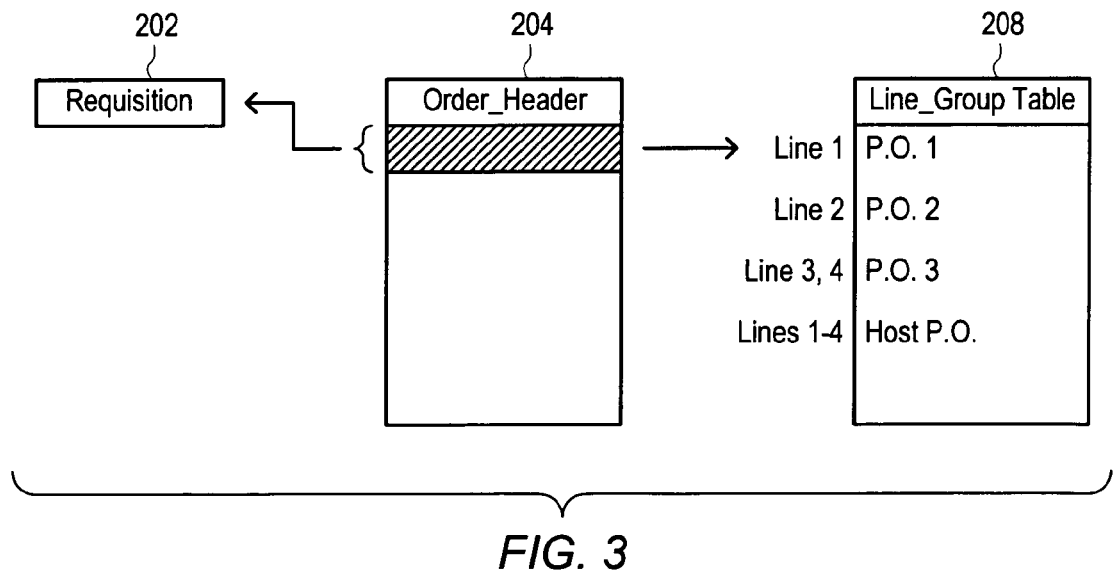
FIG. 3 illustrates block diagrams showing the manner by which lines are grouped into purchase orders by the line grouping mechanism in accordance with an embodiment of the present invention.

More specifically, the implementation of the dynamic criteria based line-grouping mechanism for PO generation follows a design pattern using four tables: a requisition table 202, an order_header table 204, a line_group_unit (LGU) table 206, and a line_group table 208. The requisition table 202 comprises all line items from the shopping cart in one or more electronic commerce sessions. FIG. 3 shows the requisition 202. The order_header table 204 comprises requisitions and maps the requisitions 202 to its line_group table 208 using the selected criteria in the LGU table 206.

The LGU table 206 is a configuration table that comprises the criteria for the dynamic criteria based line-grouping mechanism for PO generation. These are the selected criteria on which line items are grouped into a purchase order as represented in the line_group table 208. In the present embodiment, the LGU table 206 has four possible criteria: billed_to, send_to, supplier, and currency. Each criterion has a "selected" box and a "not selected" box. A specific criterion can be selected by clicking the "selected" box. The LGU table 206 holds criteria, e.g., bill-to, send-to, etc. and is used to persist the value for each PO. There is another table, Criteria Value Table which holds the values for these criteria, like San Jose, Toronto, etc. A persist value remains unchanged throughout the purchase process. Because there can be one or many suppliers in a requisition, the billed_to criteria is the name of the person, corporation, organization, or entity that the PO is charged to. The send_to criteria is the name of person, corporation, organization, or entity that the approved purchase order is sent to. The supplier, billed_to, send_to criteria can be either domestic or international. The currency criteria is the preferred type of money payment such as U.S. dollar, Japanese Yen, French Franc, Deutsche Mark, etc. A consumer can choose any of the criteria to group and generate PO according to the consumer's purchasing need by merely altering one or all of the above criteria into this file 206. Lines from the order_header table 204 are grouped into PO's in the line_group table 208 according to the selected criteria from the LGU table 206. The user can establish the contents of the LGU table 206 which then dictates how line items will be grouped into line_group table 208.

The program groups line items of the same criteria together in the line_group table 208 to form purchase orders according to processes discussed in details later in this application. Therefore, the line_group table 208 comprises POs and a host PO A host PO is a dummy line_group object created for every requisition. The host PO object is related to all the lines in the requisition and hence encompasses all the POs. The host PO, hence, represents all line items in a requisition.

FIG. 3 shows further details regarding the block diagram showing the data structure of the program. FIG. 2 shows the basic structures of the program, while FIG. 3 shows the basic structure with an example regarding the manner the program organizes lines, criteria, purchase orders into different tables discussed in FIG. 2. FIG. 3 illustrates an example of four line items that are added into requisition table 202.

More specifically, the requisition table 202 comprises four line items: line1, line2, line3, and line4. The requisition table 202 is represented as a line in the order_header table 204. Table 204 maps the requisition 202 with the line_group table 208 that it belongs to. The program uses the dynamic criteria based line-grouping mechanism for PO generation to group line1 through line 4 into different POs in the line_group table 208. To illustrate the manner by which the program uses these tables to group line items into PO, assume that the selected criteria as represented in LGU table 206 are supplier, and currency as illustrated by the check marks in the "supplier" box and the "currency" box shown in FIG. 3. And assume further that line 1 and line 2 have different suppliers and currencies, and line 3 and 4 are the same supplier. The program searches through each line and groups line1 into PO1, line2 into PO2, and line3 and line4 into PO3. The host PO comprises all four lines 1 through 4. The specific example below illustrates how the line_group table 208 works.

In a requisition, a consumer adds four items into her shopping cart: a Rolls Royce from a supplier in England, a Honda from a supplier in Japan, a Buick and a Trans_Am from the same supplier in the United States. Assume these suppliers prefer payment in their own currency. Line1 is a Rolls Royce from an English supplier with the currency in Pound Sterling. Line 2 is a Honda from a Japanese supplier with the currency in Japanese Yen. Line 3 and Line 4 are a Buick and a Trans-Am respectively from a supplier in the U.S. with the currency in U.S. dollar. With the selected criteria being the suppliers and currency as mentioned above, the program groups line 1 into PO1, line2 into PO2, line3 and line4 into PO4 in the line_group table 208. The host PO comprises all four cars.

An example to illustrate the use of the host PO is as follows. The consumer has a 10% discount coupon for any car she buys. The host PO relates to all lines and is used to subtract 10% from the purchase price of each line because the value of each PO is persistent or unchangeable. The host PO is particularly useful when a consumer has different coupons for different requisitions from different e-commerce purchase sessions. Instead of going through each PO and searching for the discounted criteria, the host PO can automatically discount all lines associated with it.

Figure 4A:
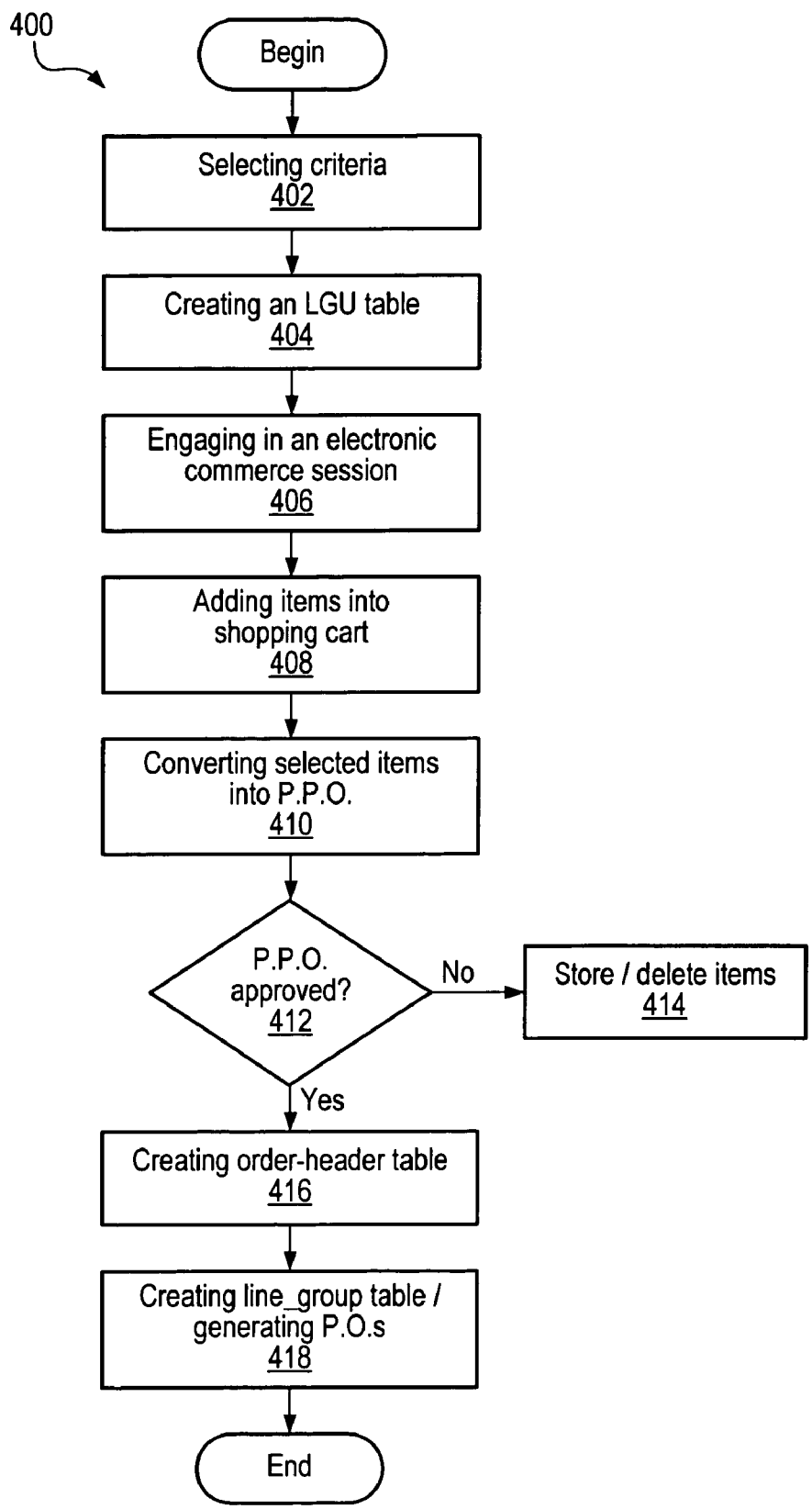
FIG. 4A illustrates a flow chart of the software program that uses a dynamic criteria based line grouping mechanism for purchase order generation in an electronic commerce session in accordance with an embodiment of the present invention.

FIG. 4A illustrates a process 400 of the software program. The flow chart 400 shows steps involved in generating POs in an electronic commerce session using the dynamic criteria based line-grouping mechanism. First, the program allows a consumer to select a set of criteria, engage in an electronic commerce, and add items into a virtual shopping cart. Then the program converts items in the shopping cart into lines, organizes lines into a order_header table, use the selected criteria to group lines into purchase orders in a line_group table. The program also creates a line_group_unit (LGU) table which comprises all selected criteria.

More specifically, the process begins at step 402 where consumers select the criteria to group purchase orders. There are four criteria for consumers to select from: seller, billed_to, send_to, and currency. A consumer chooses these criteria at the installation or at the run-time of the program. Each criterion has a box entitled "selected" and another box entitled "unselected" box next to it. The consumer selects a criterion by clicking on the "selected" box as discussed above in FIG. 2 and FIG. 3. The selected criteria are then automatically input into an LGU configuration file in the program. Thus, the consumer does not need to compile the program again every time he or she selects new criteria. At the installation or at the run-time of the program, the program instructs the consumer to select a set of criteria. For example, one consumer may decide seller and currency as the criteria for grouping POs while another may have only seller. The program automatically changes the configuration file according to the selected criteria and alters the LGU configuration file.

At step 404, after a set of criteria has been selected, the program creates the LGU table 206 which comprises all selected criteria. As mentioned above in step 402, the criteria to be selected are seller, billed_to, send_to, and currency. The LGU table 206 also includes a host criteria. The host criteria includes all four criteria. For example, if a consumer selects currency as a criteria to generate POs, the LGU table 206 comprises currency and host criteria. If a consumer selects currency and supplier as criteria, the LGU table 206 comprises currency, supplier, and the host criteria. The host criteria is not used to generate POs. Only selected criteria are used to generate POs.

At step 406, the buyer engages in an electronic commerce session using the program. The present invention program provides interactive network session outbound and inbound to the suppliers. In other words, the program allows buyer to enter the cyberspace, engage in an electronic commerce session, and send POs via outbound route to the suppliers for procurement purpose and for other purposes. In an electronic commerce session, for tracking purposes, each computer connected to the Internet is assigned a machine identification number generally known as a cookie. Each supplier and each advertised item in a banner have a different ID number for the purpose of identification and procurement. In order to engage in an electronic commerce session, a buyer can enter the electronic commerce and advertising on interactive network such as the World Wide Web (WWW) or a supplier's web page. When a buyer uses the computer system 100 to purchase online, the buyer uses a commercially available software to browse items available online. All commercially available software have a list of suppliers and a virtual shopping cart (shopping cart). The buyer looks around by clicking on the suppliers that provides the products the buyer wants to purchase. Then the buyer adds items that he or she likes into the shopping cart.

At step 408 of FIG. 4A, the buyer adds items into a virtual shopping cart. The shopping cart is a database that can keep track of the number of items that are added thereto. The operation of a shopping cart database is well-known in the art. Each item of the shopping cart is a line item. The list of line items of the shopping cart makes up a requisition. Each item of the shopping cart contains criteria data or attributes that are related to the criteria selected within the LGU table 206 discussed hereinabove. These attributes allow the program to perform purchase order sorting based on the selected criteria of the LGU. The selected items in the shopping cart are line items and they can be grouped into planned purchase orders (PPO). All items in a shopping cart fall within a requisition. Like shopping in reality, when engaging in an electronic commerce session, a buyer adds the items he or she wants to buy into a virtual electronic shopping cart. A shopping cart can keep track the number of items and the ID of each item added into it. The program converts each item in a shopping cart into a line item. A line item is an array that has attributes associated with the object including criteria. For example, each item has an ID provided by the supplier, a supplier's server ID, and a buyer's machine ID. Within each item ID number, there are other sub-categories to further identify items by types of product, made-in, quantity, etc. Thus, each item can be easily converted into an array with each ID stored in the array's cell. Importantly, each item also includes information as to the supplier, billed to address, send to address and currency used to purchase.

At step 410, the program groups each line item in the shopping cart into planned purchase orders (PPO). The PPO is then submitted for approval. The program groups the line into a planned purchase order (PPO) every time a line is added into the electronic shopping cart. This allows the user to know exactly how many POs are getting generated for his requisition at anytime. Once the requisition is fully approved, the PPO becomes a real PO For example, a buyer for company A purchases 10,000 transistors from supplier B and 100,000 surface-mount resistors from supplier C. Assuming the user selected supplier name as a sorting criteria, the program converts the resistors into a PPO and the transistors into a different PPO. These two PPOs are then submitted for approval. As mentioned above, all lines in the electronic cart are a requisition. In the above example, all the resistors and transistors make up a requisition.

At step 412, the PPOs go through an approval process performed by the consumers. If any PPO is not approved, at step 414, the program then either deletes that PPO from the shopping cart or stores it for later use. A deleted PPO will not be grouped and sent to suppliers for procurement purpose. Otherwise, the approved PPO's are proceeded into the next step. In the example above, if the surfaced mount resistors are not approved by Company A because they do not meet the design requirements, the surface mount resistors will be either deleted from the requisition or store away for later use. In this situation, only the PPO for transistors will get approved and becomes a real PO At step 416, the program designates all approved PPO's into the order_header table 204. Thus, the order_header table 204 comprises all selected items that make up a requisition. The order_header table 204 is a location in which selected and approved line items are sorted into purchase orders of the same criteria. In the example above, if the transistors were approved and the surface mount resistors are not, the order_header table 204 comprises only one item, which is the transistor. On the other hand, if both the surface mount resistors and transistors were approved at step 412, the order_header table 204 comprises two line items: the transistors, and the surface mount resistors.

Finally, at step 418, the program goes through the selected criteria from the LGU configuration file and groups line items (or approved PPOs) in the order_header table 204 into lines of the same criteria. The program groups lines of the same criteria together into a PO and creates a line_group table 208. The line_group table 208 also includes a host PO relates to all lines of the requisition. The host PO is the object of the host line. In the example above, assume the selected criteria in the LGU table 206 is currency. And assume further that the transistors are purchased from company A and the preferred payment is in Japanese Yen; and the surface mount resistors were purchased from the Company A's subsidiary in the US and the preferred payment is in US dollars. At step 418, the LGU table 206 contains only one criteria, which is the currency. The order_header table 204 contains two line items, which are the transistors and the surface mount resistors. The program uses the currency criteria to group these two items into purchase orders and creates a line_group table 208. As a result, the line_group table 208 contains two POs: the first PO is the transistors payable in Japanese Yen, and the second PO payable in U.S. dollars. However, if the selected criteria were supplier, the order_header table 204 remains the same, but the line_group table 208 now contains only one purchase order because both items were purchased from company A.

FIG. 4A shows the process 400 of the dynamic criteria line grouping mechanism software program used in an electronic commerce session. The process 400 illustrates the manner the dynamic criteria line grouping mechanism software program generates purchase orders by enabling the consumers to selects criteria, generating a LGU table, engaging in electronic commerce, selected items, generating the order_header table 204, and mapping the order_header table 204 into line_group table 208 which contains purchase orders which are selected items of the same criteria.

Figure 4B:
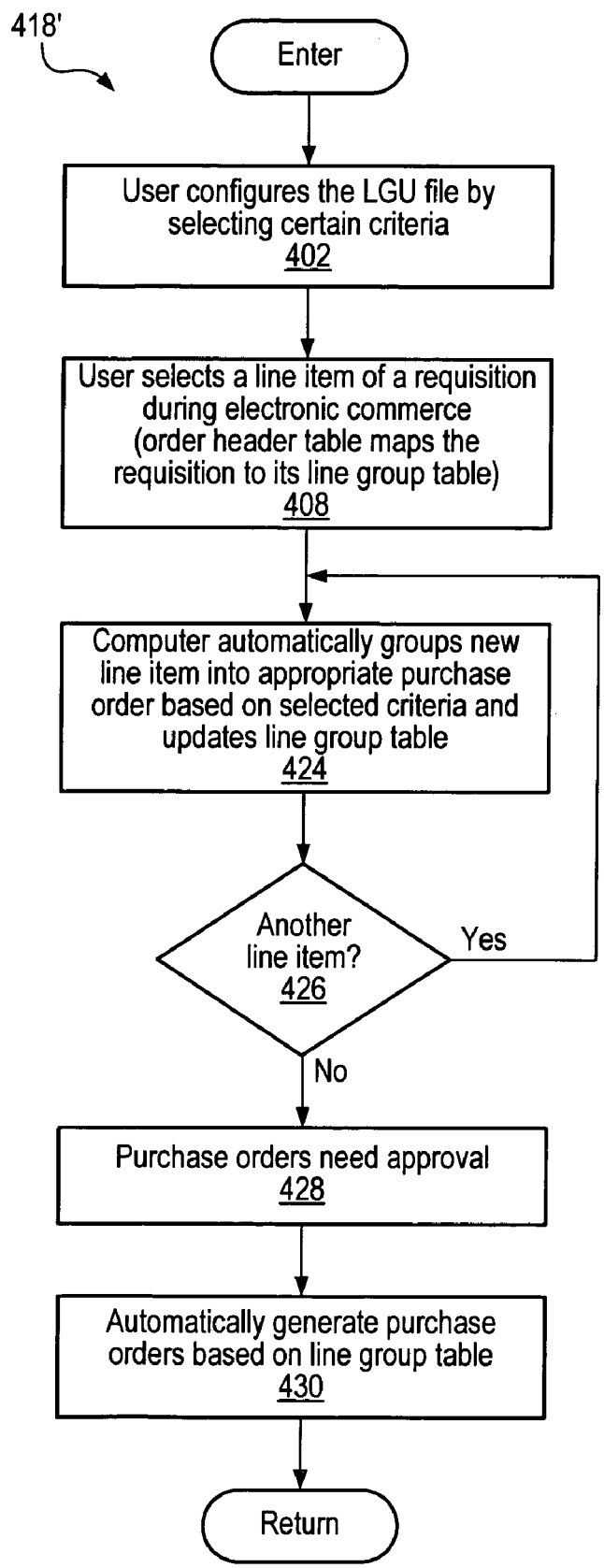
FIG. 4B illustrates a flow chart showing further steps by which purchase orders are generated by dynamic criteria line grouping mechanism in accordance with an embodiment of the present invention.

FIG. 4B further illustrates features of process 400, showing in more detail the steps of purchase orders generation by the dynamic criteria line grouping mechanism program. FIG. 4B focuses on the step 418. The steps include generating the LGU file 206 and the line_group table 208, updating line items, generating purchase orders based on the line_group table 208.

More specifically, at step 402, when a user enters the program, the program prompts the user to select a set of criteria to generate the purchase orders. As mentioned above, the criteria available in one embodiment of the present invention are currency, supplier, billed_to, and send_to. It is to be understood that more criteria can be used in another embodiment of the present invention. The program then uses the selected items to generate a LGU configuration file. The LGU configuration file is the basis by which the program generates purchase orders. And the user can change LGU file to adapt to his or her changing purchasing needs. The user can change the LGU configuration file either at the installation of the program at run time, or even during an electronic commerce session. Whenever the user changes the criteria, the program takes new set of criteria and generates a new LGU configuration file accordingly.

At step 408, the program generates the line_group table 208 based on items selected by user in a requisition and the criteria in the LGU configuration file. After the user selects an item from the requisition, the program groups these items in the order_header table 204. The order_header table 204 contains requisition or line items selected and placed in a shopping cart by an user. The order_header table 204 then maps the requisition (or its contents) into the line_group table 208.

At step 424, the program groups new line items into appropriate purchase orders based on selected criteria contained in the LGU table 206 and updates this table. The program goes through line items in the order_header table 204 in an incremental step of one to generate a purchase order for each line item.

At step 426, the program checks whether there is any more item to be grouped into purchase orders in the order_header table 204. If there are still line items in the order_header table 204, the program goes back to step 424 to group this new line item into an appropriate purchase order and update the line_group table 208. Otherwise, the program proceeds to the next step. The program continues this step until the line items in the requisition are exhausted. Furthermore, at step 426, the program decides whether the user has modified his or her acquisition. The modification of the acquisition table 202 includes adding, deleting, recalculating (recalc) actions. These actions will be discussed in details in FIG. 7.

At step 428, after all purchase orders are created and grouped in the line_group table 208, the program submits purchase orders for approval for the final time before generating them from the line_group table 208. It is important that the purchase orders are approved or checked for accuracy for the second time before generating because it is time consuming and costly to correct erroneous and unapproved purchased orders.

At step 430, after all purchase orders are approved and checked for errors, the program automatically generates purchase orders based on the line_group table 208. Generating Purchase orders means that the purchase orders are encoded by the program so that they can be accepted and understood by other commercial software program used by the suppliers.

During the encoding process, all variables and attributes of each purchase order are encoded to a given format for the outbound route. After that, the generated purchase orders are now ready to be sent via outbound route to suppliers for procurement.

Figure 5:
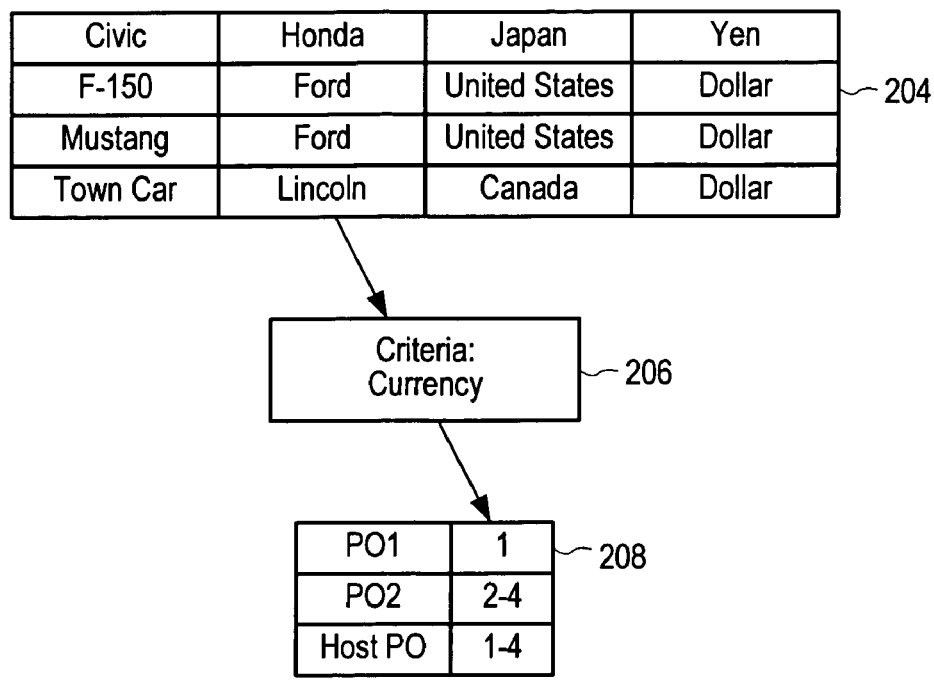
FIG. 5 illustrates data structures resulted from an example in which a user uses currency as a criteria to generate purchase orders using the dynamic criteria line grouping mechanism in accordance with an embodiment of the present invention.
Figure 6:
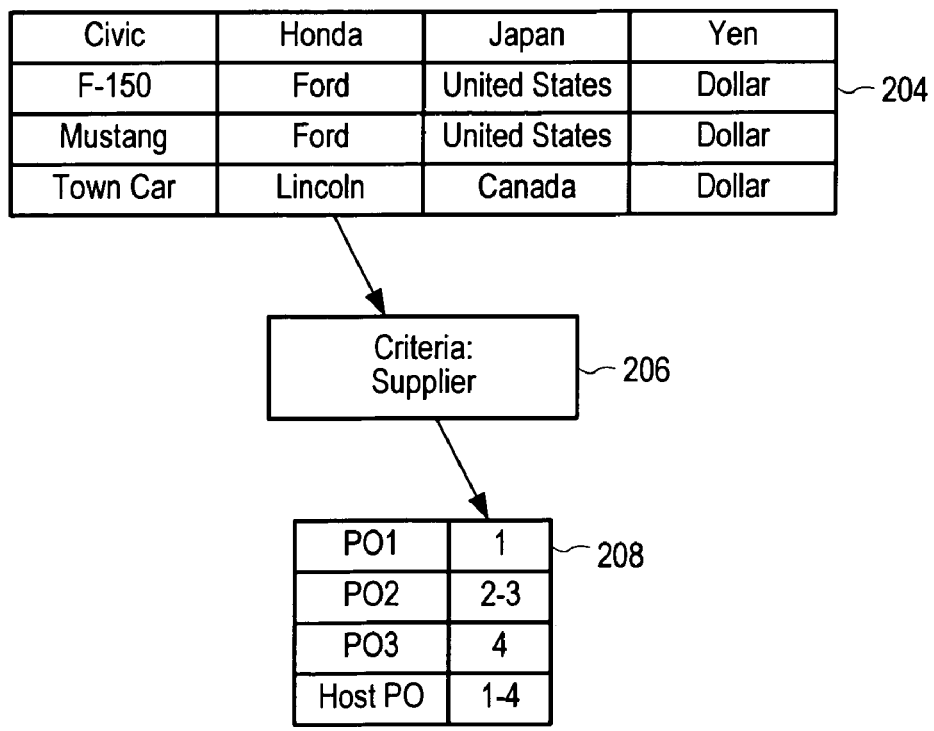
FIG. 6 illustrates data structures resulted from another example in which a user uses supplier as a criteria to generate purchase orders using the dynamic criteria line grouping mechanism in accordance with an embodiment of the present invention.

FIG. 5 and FIG. 6 show examples that further illustrate the manner the data structure block diagrams and purchase orders of FIG. 2 and FIG. 3 are created by the processes 400 and 418. FIG. 5 illustrates data structures resulted from an example in which an user uses currency as a criteria to generate purchase orders using the dynamic criteria line grouping mechanism in accordance with an embodiment of the present invention. FIG. 5 illustrates the data structure of the program with an example regarding the manner the program organizes lines, criteria, purchase orders into different data structure tables as discussed in FIG. 2 and FIG. 3.

More specifically, in FIG. 5, assume a car dealer from a car dealership wants to engage in an electronic commerce session to purchase cars to add into his current fleet. At stage 402 of FIG. 4A, at the beginning the electronic commerce session, the dynamic criteria line grouping mechanism software program prompts the dealer to select a set of criteria to generate purchase orders. The car dealer selects the currency criteria by clicking on the appropriate "selected" boxes. As a result, at stage 404 of FIG. 4A, the program generates the LGU table 206 which contains only one currency criteria as shown in FIG. 5. At stage 406, the program then allows him to engage in an electronic commerce session filled with advertisements for cars from different car manufacturers in the world. At stage 408 of FIG. 4A, the car dealer selects four cars and inserts them into his virtual shopping cart. The selected cars are: a Civic Honda from Japan payable in Yen, an F150 Ford made in the U.S. payable in dollar, a Mustang Ford made in U.S. payable in dollar, and a town car Lincoln made in Canada payable also in dollar. The requisition comprises four line items. Each line item represents a car: line item 1 represents the Honda Civic, line item 2 represents the F150 Ford, line item 3 represents the Mustang Ford, and line item 3 represents the Town Lincoln car. Because adding line item is an incremental process, the program adds line item one by one to the requisition table 202 according to steps 424 to 426 as shown in FIG. 4B.

Thus, the requisition table 202 finally contains four line items 1-4. At stage 410 of FIG. 4A, the program converts the selected cars into plan purchase orders (PPOs) and wait for approval. At stage 412, the car dealer checks his annual quota and approves all four cars. At stage 416, the program creates the order_header table 204 and moves all four approved line items representing four therein. The content of the order_header table 204 is shown in FIG. 5. Finally, at step 418, the program creates a line_group table 208 by mapping the order_ header table 204 using the LGU table 206 as the generating criteria. Because purchase order is line items of the same criteria, the line_group table 208 contains two different POs: PO1 contains line item 1 representing the Civic by Honda supplier from Japan payable in Yen, PO2 contains line items 2 through 4 representing the F150 and Mustang by Ford supplier, and the Town by Lincoln Supplier, all payable in US dollars. The line_group table 306 also comprises a host PO which has all four line items 1-4. The result of the line_group table 208 is shown in FIG. 5.

FIG. 6 illustrates another example to show the inter-relationships between the data structure block diagrams of the programs shown in FIG. 2 and FIG. 3 and the processes of generating POs as shown in FIG. 4A and FIG. 4B. In FIG. 6, the car dealer selects supplier as the criteria and the result is different from example in FIG. 5.

More specifically, in FIG. 6, assume that this quarter, the car dealer wants to change the criteria to supplier. At step 420 of FIG. 4B, the car dealer configures the LGU files by selecting "supplier" and deselecting the "currency" box. The program takes the new "supplier" criteria and changes the LGU configuration file accordingly. At step 422, the car dealer selects the Honda Civic from Japan as line item 1, and the order_header table 204 has only one line item. At step 424, the program checks whether there is a PO already existed for this line item. If there is a PO for supplier Honda, this line item is added to that PO Otherwise, the program creates a PO for this line item in the line_group table 208. The program has mapped the Honda Civic line item from the requisition table 202 to its line_group table 208. At stage 426, the car dealer selects the F150 Ford. As a result, the order_header table 204 now contains two line items: the Honda Civic, and the F150 Mustang. Step 424 repeats, the program has mapped the F150 Mustang line item from the requisition table 202 to its line_group table 208; and the line_group table 208 now has two POs. Steps 424 and 426 repeat for the Mustang Ford and Town Lincoln. Because the Mustang Ford has the same "supplier" as the F150 Ford, and the Ford PO has already existed, the Mustang Ford is added to this PO Finally, the Town Lincoln is added to a newly generated PO for Lincoln supplier. As a result, at stage 428, the line_group table 208 now contains three different POs: PO1 is line item 1 representing the Civic by Honda supplier from Japan. As a result, the line_group table 208 now contains three different POs: PO1 is line item 1 representing the Civic by Honda supplier from Japan pay, PO2 is line items 2 and 3 representing the F150 and Mustang, respectively, by Ford supplier from the U.S., and PO3 is line item 4 representing the Town by Lincoln Supplier, Canada. The result of the line_group table 208 is shown in FIG. 6. At stage 430, PO1, PO2, PO3 are generated based on the line_group table 208.

Figure 7:
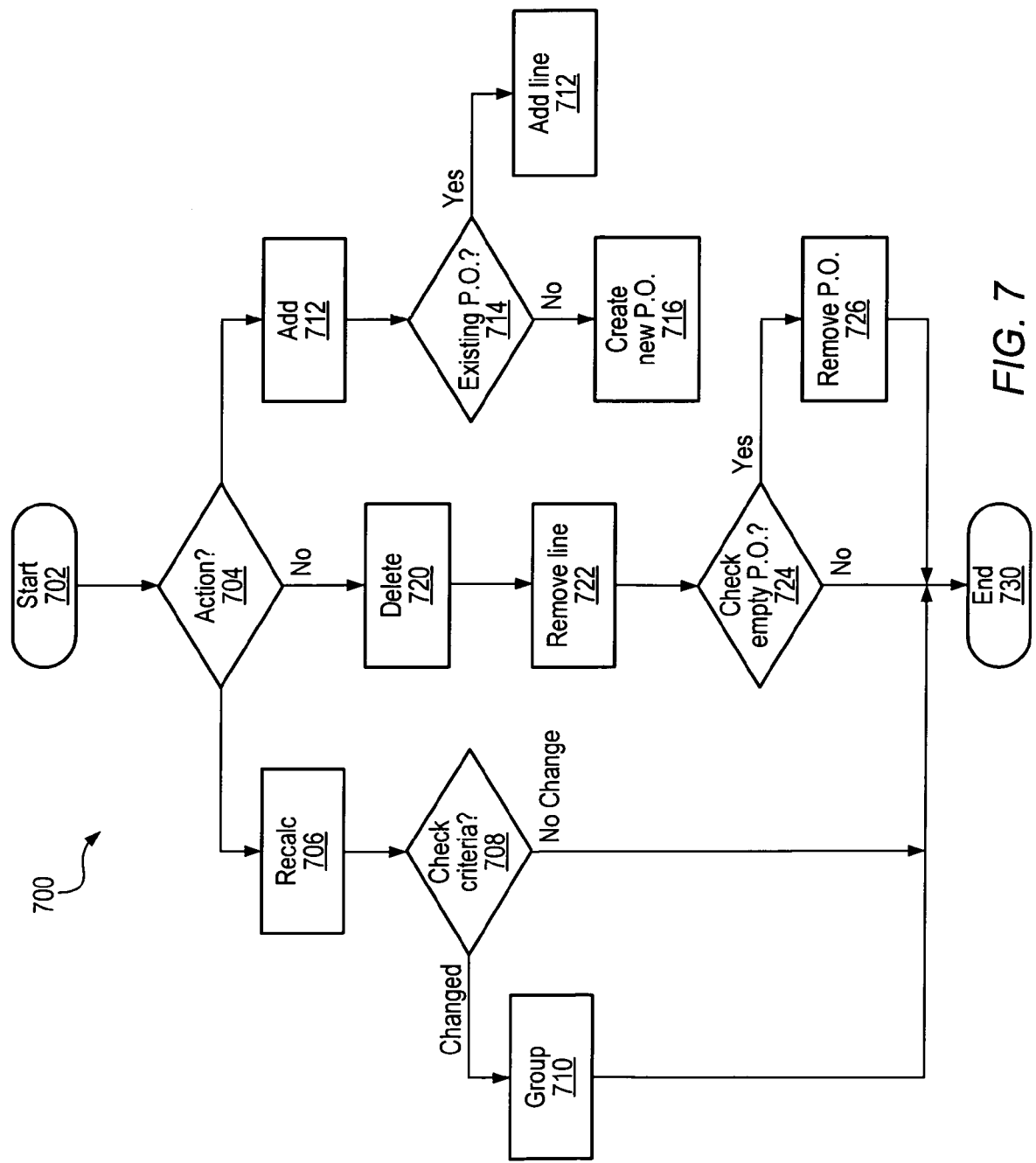
FIG. 7 illustrates a flow chart of a method of generating a line_group table to group lines into purchase orders using the line-grouping mechanism in accordance with an embodiment of the present invention.

FIG. 7 illustrates the manner by which the line-grouping of step 418 of FIG. 4B groups lines of the same criteria together into a PO The dynamic criteria based line grouping mechanism for purchase order generation groups lines by recalculating (recalc) criteria, adding land deleting lines. Recalc is a batch process by which the program goes through all criteria and group lines together. While adding and deleting are incremental process by which the program examines whether a PO for that line existed. If no, the program creates a new PO in case of adding, and terminates in case of deleting. Otherwise, if a PO has already existed, the program adds the new line into it. In case of deleting, the programs deletes a line from that PO and examines if that PO contains any more lines. If yes, the deleting function deletes that empty PO; otherwise, it ends the process.

More specifically, at stage 702, the operation begins. At this stage, the consumer has selected the criteria PO at the installation time as mentioned at step 402 of FIG. 4A, and created the line_group_unit (LGU) table 206 for these criteria at step 404. The configuration file has the selected criteria in the LGU table 206.

At stage 704, the program determines whether the user has chosen to recalc, add, or delete a line item. If the user has chosen to recalc, the program proceeds to stage 706. At stage 706, the program acknowledges that a recalc function has been selected and moves to stage 708 to check whether the criteria has been changed at step 402 of FIG. 4. If yes, the program proceeds to re-group the lines at stage 710. Recalc is a batch process that gets the LGU grouping criteria and processes all lines. If no criteria have been entered, the program terminates at stage 730. Otherwise, if the consumer chooses to delete at stage 704, the program moves to stage 720. At stage 720, the program determines which line to be deleted and goes to the line_group table 208 to remove that line. At stage 722, the selected line is removed from the PO Then at stage 724, the program determines whether the PO containing the deleted line is empty. If the PO is empty, the program removes the PO at stage 726, and terminates at stage 730. If the PO is not empty, the program has completed the delete action and terminates at stage 730. If the selected action at stage 704 is add, the program proceeds to stage 712. At stage 712, the program goes to the specific line in the order_header table 204 to add the line into the corresponding PO in the line_group table 208. Before adding, the program determines whether a PO of the same criteria as the line has already been generated in the line_group table 208. If a PO is found, the program adds that line to the existing PO in the line_group table 208 at stage 718. If no PO is found, the program creates a new PO in the line_group table 208.

Figure 8:
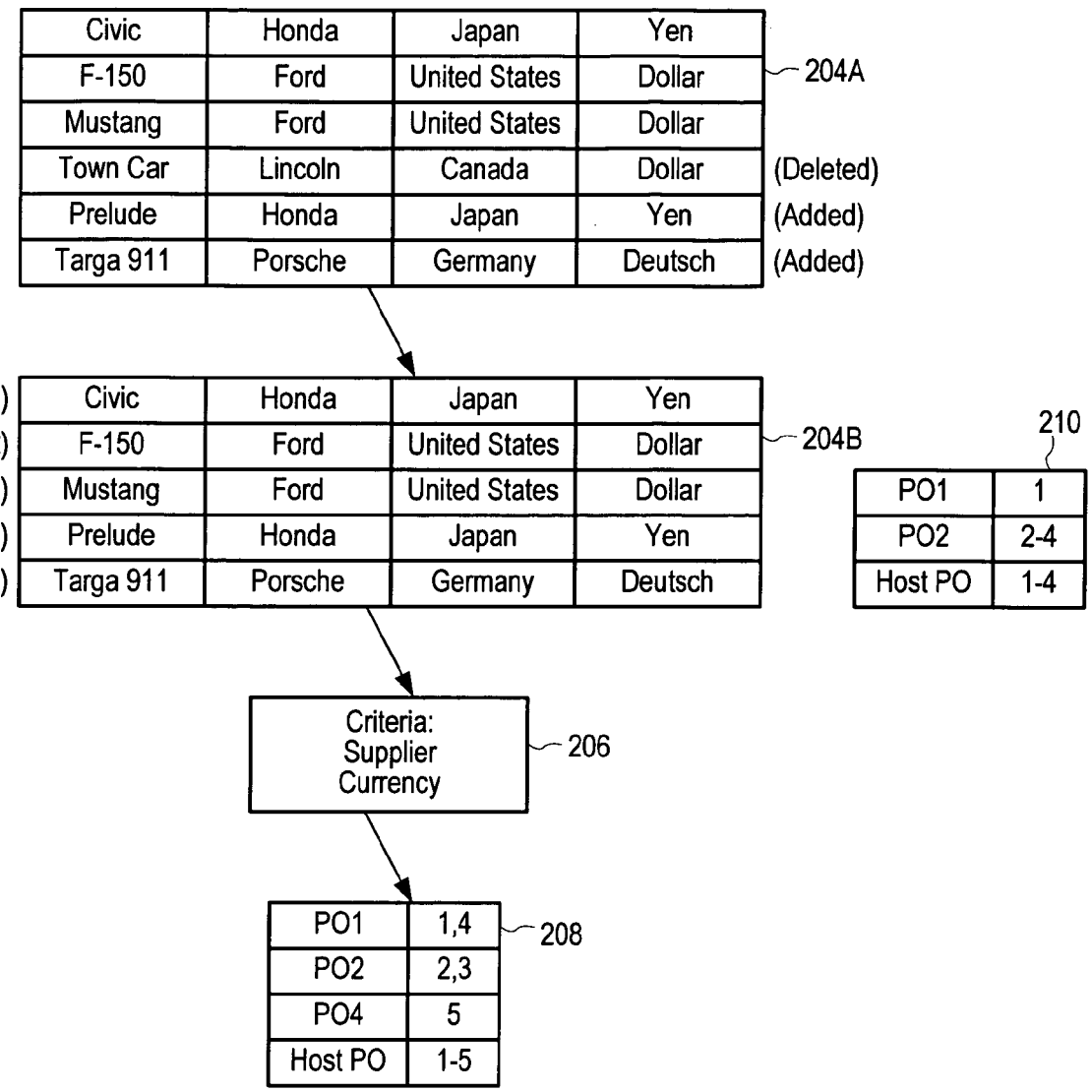
FIG. 8 illustrate the data structures resulted from an example in which a user modifies a requisition table and recalculates a LGU table in accordance with an embodiment of the present invention.

FIG. 8 shows the basic data structure example in which the program uses process 700 to modify the line_group table 208. The examples in FIG. 5 and in FIG. 6 are used to add, delete lines items and recalc the criteria. In this example, the car dealer adds a Honda Preludes from Japan payable in Yen, a Porsche Targa 911 from Germany payable in Deutsche Mark, and delete the Lincoln Town car from Canada. The car dealer also changes the criteria to "supplier" and "currency" and generates POs according to the line_group table 208. FIG. 8 also illustrates an initial grouping 210 before delete and add operations are performed.

More specifically, in FIG. 8, the car dealer in Examples 5 and 6 above decides to modify his requisition. Assume that in every quarter, the car dealer buys the same cars listed in the examples 5 and 6 above from the same suppliers. At step 420 of FIG. 4B, the car dealer re-configures the LGU files by selecting "supplier", adding supplier to a set of criteria in the LGU table 206. The program takes the additional "supplier" criteria and changes the LGU configuration file and the LGU table 206 accordingly. Because the same cars are purchased every quarter, the car dealer does not need to engage in another electronic commerce session to look for the same four cars described in Examples 5 and 6 above. Instead, the car dealer decides to delete the Lincoln Town car. At stage 424 of FIG. 4B, the program notices that an action to change the line_group table 208 has commenced. The program then goes to process 700 to execute this action. Program begins to modify the line items at stage 702. At stage 704, the program determines which action, e.g., add, delete, or recalc, has been entered. At stage 720, the program receives an action to delete a line item. At stage 722, the program proceeds to remove the line item Lincoln Town car from the requisition table 204. At stage 724, the program checks whether PO 3 is empty of line items. PO 3, which contains line item Lincoln Town car, is now empty. The program removes PO 3 at stage 726 and ends this "delete" action at stage 730. As soon as process 700 ends, the program goes back to step 424 of FIG. 4B to update the line_group table 208 and check whether another action to add or delete line items have been entered.

Next, the car dealer decides to add to his requisition a Honda Prelude from Japan, payable in Yen. The program goes to process 700 to add this line item. At stage 704, the program acknowledges from step 424 that another line item has been added to the requisition table 202. At stage 714, the program prepares to add this line item. Before adding, the program checks if a PO for this category is existed. Finally, The program goes to steps 424 of FIG. 4B to group the Honda Preludes to PO1 and updates the line_group table 208 by going through the recalc action 706. At stage 708, the program checks the LGU table 206 for new criteria. At stage 710, the program groups the order_table 204 according to the new set of criteria. In this example, the new set of criteria is "supplier" and "currency" as shown in table 206 of FIG. 8. As a result, the line_group table 208 now has PO1 which contains line item Honda Civic and Honda Preludes because they both have the same currency and supplier criteria. The program goes to step 424 to update the line_group table 208 and check whether another action has been entered.

Finally, the car dealer decides to add a Porsche Targa 911 from Germany, payable in Deutsche Mark to his requisition. Similar to the Honda Preludes situation above, the program goes to process 700 to add this line item according to step 714 of FIG. 7. In this situation, because a Porsche supplier and Deutsche Mark currency are new, the program goes to step 716 to create a new PO for this line item. As a result, the updated order_header table 204 includes Porsche Targa 911. As soon as the add action is completed, the program goes to step 424 of FIG. 4B to update the line_group table 208. Again, the program goes to process 700 and recalc action at step 706 to group all POs. The line_group table 208 now includes PO1 comprising line items 1 and 4, PO2 comprising line items 2 and 3, and PO4 comprising line item 5, the host PO comprising all line items from 1-5.

Because there is no more action at step 426 of FIG. 4B, the program goes to step 428, submitting the order_header table 204B for approval. After all five cars have been approved, the program goes to step 430 of FIG. 4B to generate all three POs based on the line_group table 208. As a result, the line_group table 208 now contains three different POs: PO1 includes line item 1 capturing the Civic by Honda supplier from Japan payable in Yen, line item 4 capturing a Preludes by Honda, also payable in Yen; PO2 includes line items 2 capturing a F150 and Mustang, payable in dollars, line item 3 representing a Mustang by Ford, payable in dollars; and PO3 includes line item 5 representing a Targa 911 by Porsche from Germany, payable in Deutsche Mark.

The original order_header table 204A, the final order_header table 204B, the LGU table 206, and the line_group table 208 of this example are shown in FIG. 8.

Although particular embodiments of the present invention have been shown and described, it will be obvious to those skilled in the art that changes and modifications can be made without departing from the present invention in its broader aspects. For example, a variety of programming languages can be used to implement the present invention, such as the well-known JAVA programming language, C++ programming language, C programming language, or any combination thereof. Also, the present invention can be used with a variety of multimedia communication environments, such as the well-known HTML or VRML environments, and a variety of protocols, such as the standard HTTP or SSL protocols. Therefore, the pending claims are to encompass within their scope all such changes and modifications that fall within the true scope of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for automatically generating purchase orders in a computer implemented procurement system, comprising:
    accessing a user modifiable configuration file comprising a selected list of criteria on which line items are to be sorted into purchase orders;
    modifying the selected list of criteria in response to user input;
    traversing a list of line items associated with a requisition, each line item comprising an item description and criteria data, and automatically grouping said line items of said list into purchase orders wherein all items of a given purchase order have matching criteria data with respect to any criteria of said modified list of criteria;
    storing results of said grouping into a line group data structure that is mapped to said requisition, wherein the line group data structure indicates one or more groups of one or more line items according to the results of said grouping; and
    generating separate purchase orders according to said line group data structure.

2. A method as described in claim 1 further comprising an order header data structure which provides a mapping between said requisition and said line group data structure.

3. A method ad described in claim 1 wherein said requisition is represented via an electronic shopping cart.

4. A method as described in claim 1 wherein said line group data structure comprises a host purchase order item which includes all of said line items of said requisition.

5. A method as described in claim 1 wherein said modified list of criteria is selected from the group comprising: suppler name; billed_to location; send_to location; and currency.

6. A method as described in claim 1 further comprising generating said requisition by performing electronic commerce to add items to said requisition which generates said list of line items.

7. A method as described in claim 1 further comprising approving said separate purchase orders.

8. A method as described in claim 1 further comprising:
    performing modifications to said list of line items to generate a new list of line items; and
    automatically re-grouping said new list of line items into new purchase orders in response to said modifications.

9. A method as described in claim 1 further comprising sending a purchase order in an outbound route to a supplier via an Internet network.

10. A method as described in claim 1 wherein said modifying comprises allowing a user to modify said user modifiable configuration file to alter said selected list of criteria.

11. A system, comprising a bus coupled to a processor and a memory coupled to said bus, said memory comprising instructions that when executed implement a method for automatically generating purchase orders in a computer procurement system, said method comprising:
    accessing a user modifiable configuration file comprising a selected list of criteria on which line items are to be sorted into purchase orders;
    modifying the selected list of criteria in response to user input;
    traversing a list of line items associated with a requisition, each line item comprising an item description and criteria data, and automatically grouping said line items of said list into purchase orders wherein all items of a given purchase order have matching criteria data with respect to any criteria of said modified list of criteria;
    storing results of said grouping into a line group data structure that is mapped to said requisition, wherein the line group data structure indicates one or more groups of one or more line items according to the results of said grouping; and generating separate purchase orders according to said line group data structure.

12. A system as described in claim 11 further comprising an order header data structure which provides a mapping between said requisition and said line group data structure.

13. A system as described in claim 11 wherein said requisition is represented via an electronic shopping cart.

14. A system as described in claim 11 wherein said line group data structure comprises a host purchase order item which includes all of said line items of said requisition.

15. A system as described in claim 11 wherein said modified list of criteria is selected from the group comprising: supplier name; bill-to location; ship-to location; and currency.

16. A system as described in claim 11 wherein said method further comprises generating said requisition by performing electronic commerce to add items to said requisition which generates said list of line items.

17. A system as described in claim 11 wherein said method further comprises approving said separate purchase orders.

18. A system as described in claim 11 wherein said method further comprises:
performing modifications to said list of line items to generate a new list of line items; and
automatically re-grouping said new list of line items into new purchase orders in response to said modifications.

19. A system as described in claim 11 wherein said method further comprises sending a purchase order in an outbound route to a supplier via an Internet network.

20. A system as described in claim 11 wherein said modifying comprises allowing a user to modify said user modifiable configuration file to alter said selected list of criteria.

21. A method for automatically generating purchase orders in a computer implemented procurement system, comprising:
accessing a user modifiable configuration file comprising a selected list of criteria on which line items are to be sorted into purchase orders;
allowing a user to perform electronic commerce to establish an electronic shopping cart associated with a requisition, said electronic shopping cart comprising a list of line items wherein each line item comprises an item description and criteria data;
modifying the selected list of criteria in response to user input;
automatically grouping said line items of said list into purchase orders wherein all items of a given purchase order have matching criteria data with respect to any criteria of said modified list of criteria;
storing results of said grouping into a line group data structure that is mapped to said requisition via an order header data structure, wherein the line group data structure indicates one or more groups of one or more line items according to the results of said grouping; and
generating separate purchase orders according to said line group data structure.

22. A method as described in claim 21 wherein said line group data structure comprises a host purchase order item which includes all of said line items of said requisition.

23. A method as described in claim 21 wherein said modified list of criteria is selected from the group comprising: supplier name; bill-to location; ship-to location; and currency.

24. A method as described in claim 21 further comprising approving said separate purchase orders.

25. A method as described in claim 21 further comprising:
performing further electronic commerce to modify said list of line items and generating a new list of line items;
automatically re-grouping said new list of line items into new purchase orders in response to said modifications; and
updating said line group data structure.

26. A method as described in claim 21 further comprising sending a purchase order in an outbound route to a supplier via an Internet network.

27. A method as described in claim 21 wherein said modifying comprises allowing a user to modify said user modifiable configuration file to alter said selected list of criteria.

* * * * *